United States Patent [19]
Roberts

[11] 4,368,754
[45] Jan. 18, 1983

[54] WASHERLESS VALVE STRUCTURE PARTICULARLY FOR FAUCETS

[75] Inventor: Joseph S. Roberts, Brockville, Canada

[73] Assignee: Jamaica Manufacturing (Canada) Co., Ltd., Canada

[21] Appl. No.: 190,172

[22] Filed: Sep. 23, 1980

[51] Int. Cl.³ ............................................. F16K 43/00
[52] U.S. Cl. .................................. 137/315; 137/454.5; 137/454.6; 251/268; 251/357
[58] Field of Search .................. 137/454.5, 454.6, 315; 251/266, 268, 270, 357

[56] References Cited
U.S. PATENT DOCUMENTS

| | | | |
|---|---|---|---|
| 2,062,422 | 12/1936 | Meese | 251/270 |
| 2,416,085 | 2/1947 | Carpenter | 251/270 |
| 2,931,618 | 4/1960 | Frauzreb | 251/357 X |
| 3,006,361 | 10/1961 | Reinemann | 137/454.5 |
| 4,027,851 | 6/1977 | Schlotman | 251/268 X |
| 4,109,672 | 8/1978 | Szemeredi | 251/268 X |

*Primary Examiner*—Harold W. Weakley
*Attorney, Agent, or Firm*—Burns, Doane, Swecker & Mathis

[57] ABSTRACT

A washerless valve cartridge for a faucet has major components designed to be easily molded in plastics, these major components including a bonnet, a sleeve member and a plunger. The bonnet has a screw thread for retaining it on the open end of a housing having an axial inlet and a side outlet. The sleeve member is arranged to be non-rotatably secured within the housing by the bonnet, and is an integral molding of plastics material including an annular inner end portion forming a valve seat and a cylindrical portion extending from the valve seat and having longitudinal slots which allow liquid flow from the inlet to the outlet via the valve seat. A plunger also of plastic is slidable within the cylindrical portion and has projections which engage in the slots to prevent its rotation, the plunger carrying a steel ball valve member which is capable of seating on the valve seat. A valve stem is held for rotation without axial movement by the bonnet, and has a screw thread engaging an internal thread in the plunger for moving the plunger to open and close the valve. The slots in the sleeve perform the dual function of providing the sole means for liquid flow from the valve seat to the outlet as well as guiding the movement of the plunger.

7 Claims, 4 Drawing Figures

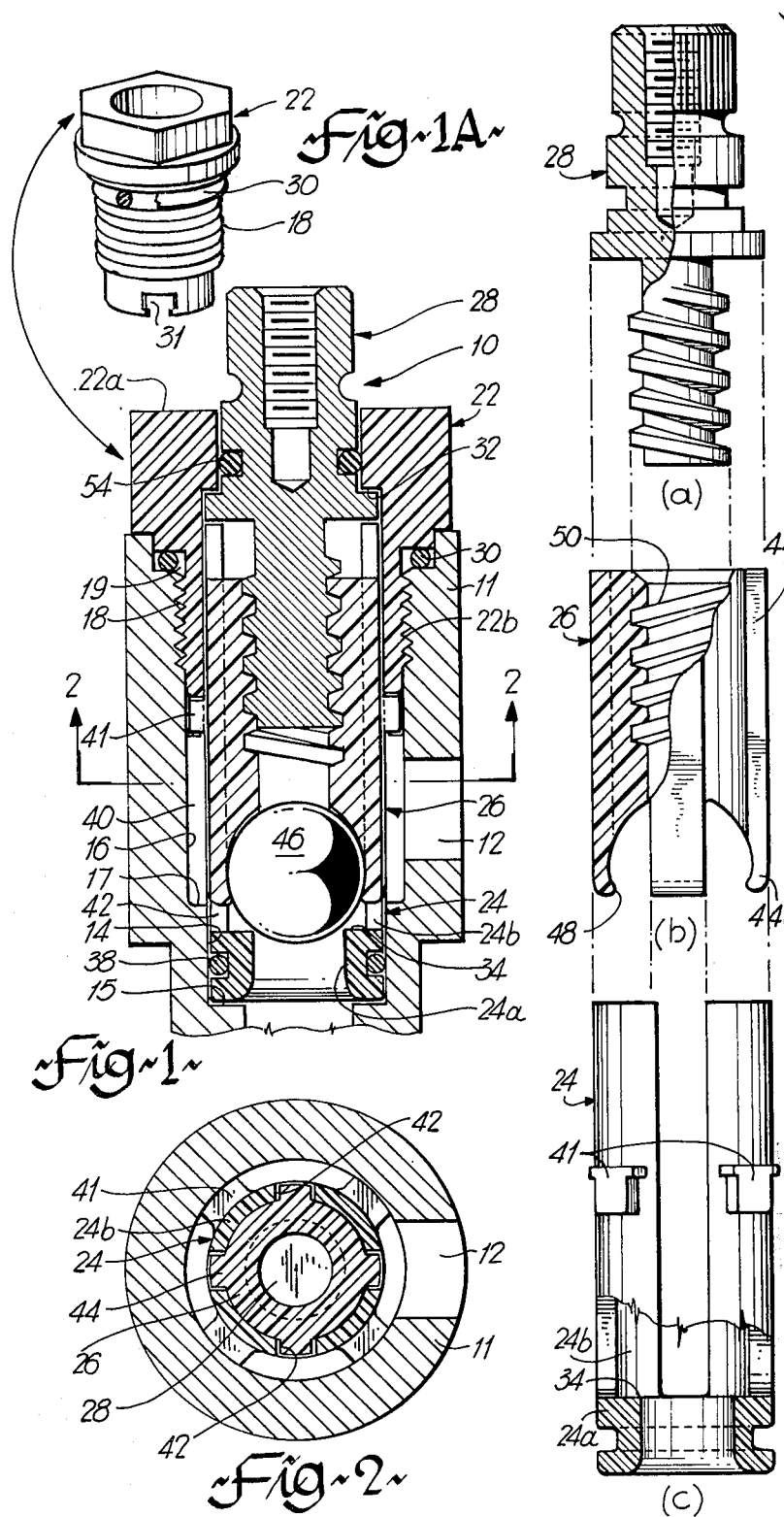

WASHERLESS VALVE STRUCTURE PARTICULARLY FOR FAUCETS

This invention relates to a fluid flow control valve, and particularly a valve for use in a domestic faucet.

Common faucet valves have washers which require replacement at intervals. Recently, so-called washerless valves have been introduced in which the working parts of the valve are in the form of a replaceable cartridge which can very easily be replaced should undue wear occur. The present invention provides a valve structure in the form of a replaceable cartridge which can be made economically, most of the parts being molded from plastics material, and which is a compression-type valve giving good flow regulation. The valve cartridge contains only four main components, three of which may be molded of plastic, and which are used with minor components including a commonly available stainless steel ball and several sealing rings.

The cartridge of this invention is designed to be inserted in a normal faucet housing having an open outer end, an axial inlet for water or other liquid at an inner end, and having a side outlet, the main parts of the valve being secured by a bonnet having means such as screw threads for retaining the bonnet on the open end of the housing. The terms "outer" and "inner" as used herein refer to the position of valve parts relative to the inner (inlet) end of the housing and its outer open end. In addition to the bonnet, the valve structure in accordance with the invention includes:

(a) a sleeve member insertable into the housing through the open end and arranged to be non-rotatably secured within the housing by the bonnet, the sleeve member being formed as an integral molding of plastics material and including an annular inner end portion forming a valve seat and a main, cylindrical portion extending from the valve seat and being provided with longitudinal, straight sided slots which provide fluid flow from the inlet to the outlet of the housing via the valve seat when the valve structure is in place in the housing, (b) a plunger slidable within the cylindrical portion of the sleeve member and having projections slidable within the slots to prevent rotation of the plunger within the sleeve member, the plunger being formed of plastics material and having at its inner end a valve member arranged to engage the valve seat with axial movement of the plunger to close the valve, the plunger being insertable into the outer end of the sleeve member and having an internal screw thread communicating with its outer end, and (c) a stem held for rotation without axial movement by the bonnet, the stem having a threaded portion engaging the internal screw thread of the plunger for moving the plunger on rotation of the stem to open and close the valve.

Preferably, the valve member is a spherical steel ball, for example a stainless steel ball as available for bearings, which is held within a suitably shaped recess at the inner end of the plunger and which directly engages the valve seat of the sleeve member without any intervening washer. The plunger has a partly cylindrical outer surface which slides within the sleeve member, this surface being interrupted by projections in the form of longitudinal ribs which slide in the slots of the sleeve member, the ribs having end portions which project beyond the cylindrical surface and which are formed as under cut resilient fingers within which the ball is a snap fit, and which provide retaining means for the ball.

The above described parts are used with the usual O-type sealing rings to prevent liquid flow between the housing and the sleeve, between the housing and the bonnet, and between the stem and the bonnet.

The invention will now be particularly described with reference to the accompanying drawings, in which:

FIG. 1 shows a longitudinal sectional through a top part of a housing containing the valve cartridge, FIG. 1A shows in perspective the bonnet of the valve cartridge, FIG. 2 shows a cross-sectional view on lines 2—2 of FIG. 1, and FIG. 3 shows an exploded view of the main novel components of the valve structure.

Referring to the drawings, the valve cartridge 10 is fitted within a conventional faucet housing which is provided by an enlarged upper end of a pipe 11 having a side outlet 12 for receiving an outlet pipe, and having a first, inner, counterbored cylindrical surface 14 extending outwardly from shoulder 15, and a second, larger counterbored surface 16 terminates at the lower end in outwardly facing shoulder 17 and at the upper end in a screw threads 18 and a sealing ring recess 19.

The cartridge 10 includes as its main components a bonnet 22, a sleeve member 24, a plunger 26 and a stem 28. Of these, the bonnet, sleeve member, and plunger are preferably formed of a hard plastics material such as 25% glass fibre filled Noryl (Trademark).

The bonnet has a hexagonal head 22a and a threaded portion 22b of reduced diameter which engages with threads 18 of the housing. Between parts 22a and 22b there is a shoulder which fits within recess 19 to compress a sealing ring 30 into this recess to provide a seal between the bonnet and the housing. The bonnet also has a cylindrical bore the inner end of which is counterbored to provide a downwardly facing internal shoulder 32. The lower end of portion 22b is provided with four rectangular notches 31 the sides of which are undercut as shown in FIG. 1A for a purpose to be described.

The sleeve member 24 is formed as an integral molding and includes an annular inner end portion 24a and a straight-wall cylindrical portion 24b extending outwardly from portion 24a, and defining with the housing an annular space 40. These portions have the same outer diameter but portion 24a has a smaller internal diameter than portion 24b so that an internal, outwardly facing shoulder is provided between these two portions which shoulder provides a valve seat 34. An external recess around portion 24a contains a sealing ring 38 which prevents any liquid flow passing up the housing outside the valve seat.

The portion 24b of the sleeve member has four external lugs 41 which fit within the annular space 40 and engage in the notches 31 of the bonnet. As shown in FIG. 3, these lugs have widened outer ends which are a snap fit in notches 31 so that the parts of the cartridge are held together as a unit before assembly in the housing, and so that the sleeve member is withdrawn when the cartridge is removed from a housing. These interlocking parts also prevent rotation of the sleeve member when the cartridge is installed, the sleeve member being held by the bonnet with the inner end portion adjacent shoulder 15 and with its upper end spaced below the internal shoulder 32 of the bonnet.

The space 40 communicates with outlet 12, and further communicates with the interior of the sleeve member via longitudinal straight sided slots 42, best shown in FIG. 3, which extend through the thickness of wall portion 24 from the top end of the sleeve member down to the valve seat portion 24a. These slots provide the sole means for liquid to flow from the area of the valve seat to the outlet. As will be seen in FIG. 2, four of these slots are provided equally spaced between the lugs 41.

Within the sleeve member 24 is slidable the plunger 26, this having a part cylindrical outer surface and having four ribs 44 extending from this part cylindrical surface and slidably fitting within the slots 42. The slots 42 thus perform the dual function of providing liquid flow from the valve seat to the outlet and also provide the guiding function for the ribs 44, preventing rotation of the plunger. The lower end of the plunger is formed with a generally hemi-spherical recess with the ends of the ribs 44 extending beyond the main portion of the plunger and beyond the center of the hemi-spherical recess to provide fingers 44a which receive and retain a spherical stainless steel ball 46. The outer ends of the fingers each have an internal lip 48, these being spaced from the center of the hemi-spherical recess by a radial distance slightly less than the radius of the recess, and the fingers flex to receive the ball 46 as a snap fit. When in place a clearance space of about 0.01 inches (0.25 mm) exists between the ball and a side of the recess so that the ball is free to move slightly radially and to rotate.

The outer end of the plunger is provided with an internal screw thread 50, and this receives the threaded projecting portion of the stem 28. The stem, which may suitably be formed of brass, is of generally conventional construction and includes an enlarged collar portion which is prevented from moving axially by being trapped between the internal shoulder 32 of the bonnet and the upper end of the sleeve member 24. Above the collar a cylindrical portion of the stem which rotates within the bonnet is provided with a recess for sealing ring 54. The upper part of the stem which projects above the bonnet has longitudinal splines on its outer surface, and has a threaded internal bore, this formation being conventional for faucets so that a suitable handle can be engaged on the splines and held by a screw.

It will be noted that the cartridge thus described is formed of relatively few parts which can be easily made. The bonnet is a simple part which can readily be made by molding in a split mold having radially movable parts which form both the screw threads and notches. The sleeve member and plunger are molded from plastics, and it may be noted that the sleeve member does not require any under cut molding or drilling operations to provide apertures for liquid flow since the flow is provided for by the slots 42. The plunger also does not require undercut molding (apart from the conventional screw thread molding) since fingers 44a can be flexed to snap off a mold core. Assembly of the parts is very simple with the steel ball 46 being merely snapped into place in the plunger recess, the plunger being telescoped within the sleeve member, after which the stem is screwed in place and the bonnet fitted over the stem with lugs 41 being then snapped into the notches in the bonnet to hold the cartridge parts together. In operation the hard steel ball can deform slightly the edges of the valve seat to provide good sealing performance, and can move slightly to centre itself on the valve seat. Also, there is no tearing of the valve seat caused by foreign material between the ball and the seat since the ball rotates relative to the plunger and does not rotate against the seat. Also, the stainless steel material of the ball resists the adhesion of foreign matter.

I claim:

1. A valve structure for insertion into a housing having an open outer end, an axial inlet for liquid at an inner end and having a side outlet, the valve structure comprising:

a bonnet with means for retaining said bonnet on the open end of the housing, said bonnet having an internal shoulder and means for providing a seal between said bonnet and the housing, a sleeve member insertable into the housing through said open end and arranged to be non-rotatably secured within said housing by the bonnet, said sleeve member being formed as an integral molding of plastics material and including an annular inner end portion forming a valve seat and a main, straight-walled cylindrical portion extending from said valve seat and being provided with longitudinal, straight sided slots which extend through the thickness of said cylindrical portion from an outer end of the sleeve member down to said valve seat and which are the sole apertures by which fluid can flow from the inlet to the outlet via the valve seat when the valve structure is in place in the housing, a plunger slidable within said cylindrical portion and having projections slidable within said slots to prevent rotation of the plunger within the sleeve member, said plunger being formed of plastics material and having at its inner end a valve member arranged to engage said valve seat with axial movement of the plunger to close the valve, said plunger being insertable into the outer end of the sleeve member and having an internal screw thread communicating with the outer end thereof, and a stem held for rotation without axial movement by the internal shoulder of the bonnet, said stem having a threaded portion engaging the internal screw thread of the plunger for moving said plunger on rotation of the stem to open and close the valve, sealing means being provided between the stem and the bonnet beyond the outer end of the sleeve member.

2. A valve structure according to claim 1 wherein said valve member is a steel ball held within a recess at the inner end of the plunger.

3. A valve structure according to claim 2 wherein said projections on the plunger are in the form of ribs which have extension forming under cut resilient fingers within which said ball is a snap fit.

4. A valve structure according to claim 1 or 2 wherein said valve member makes direct contact with the plastics material of the valve seat without any intervening washer.

5. A valve structure according to claim 1 or 2 wherein said bonnet and sleeve have interlocking parts which prevent rotation of the sleeve relative to the bonnet and which hold the parts of the valve structure together when not in place in said housing.

6. A valve structure according to claim 5 wherein said interlocking parts comprise undercut notches in the inner end of said bonnet and outwardly projecting lugs on said cylindrical portion of the sleeve member which are a snap-fit within said undercut notches of the bonnet to prevent relative rotation between the sleeve and the bonnet and to ensure withdrawal of the sleeve with the bonnet.

7. A valve structure for insertion into a housing having an open outer end, an axial inlet for liquid at an inner end and having a side outlet, the valve structure comprising:
   a bonnet with means for retaining said bonnet on the open end of the housing, said bonnet having an internal shoulder and having under cut notches in its inner end,
   a sleeve member insertable into the housing through said open end and arranged to be non-rotatably secured within said housing by the bonnet, said sleeve member being formed as an integral molding of plastics material and including an annular inner end portion forming a valve seat and a main, cylindrical portion extending from said valve seat and being provided with longitudinal, straight sided slots which provide for fluid flow from the inlet to the outlet via the valve seat when the valve structure is in place in the housing, said cylindrical portion having outwardly projecting lugs which are a snap-fit within said undercut notches of the bonnet to prevent relative rotation between the sleeve and the bonnet and to ensure withdrawal of the sleeve with the bonnet,
   a plunger slidable within said cylindrical portion and having projections slidable within said slots to prevent rotation of the plunger within the sleeve member, said plunger being formed of plastics material and having at its inner end a valve member arranged to engage said valve seat with axial movement of the plunger to close the valve, said plunger being insertable into the outer end of the sleeve member and having an internal screw thread communicating with the outer end thereof, and
   a stem held for rotation without axial movement by the internal shoulder of the bonnet, said stem having a threaded portion engaging the internal screw thread of the plunger for moving said plunger on rotation of the stem to open and close the valve.

* * * * *